United States Patent
Karri et al.

(10) Patent No.: US 11,804,018 B2
(45) Date of Patent: Oct. 31, 2023

(54) MANAGEMENT OF DEVICES IN A SMART ENVIRONMENT

(71) Applicant: International Business Machines Corporation, Armonk, NY (US)

(72) Inventors: Venkata Vara Prasad Karri, Visakhapatnam (IN); Saraswathi Sailaja Perumalla, Visakhapatnam (IN); Sarbajit K. Rakshit, Kolkata (IN); Lalitha Komarapuri, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 17/465,598

(22) Filed: Sep. 2, 2021

(65) Prior Publication Data
US 2023/0066524 A1 Mar. 2, 2023

(51) Int. Cl.
*G06T 19/00* (2011.01)
*G06F 21/62* (2013.01)

(52) U.S. Cl.
CPC ........ *G06T 19/006* (2013.01); *G06F 21/6245* (2013.01); *G06T 19/003* (2013.01); *G06F 2221/2129* (2013.01); *G06F 2221/2141* (2013.01)

(58) Field of Classification Search
CPC ....... G06T 19/006; G06T 19/00; G06T 17/00; G06T 7/00; G06T 2215/16; G06F 21/6245; G06F 2111/18; G06F 3/0481; G06F 3/04817; G06F 9/4443; G06F 3/04847; G06F 11/3664; G06F 3/012; G06F 3/0304; G06F 3/011–015; H04N 5/272; H04N 2201/3245; A63F 13/10; G02B 27/017
See application file for complete search history.

(56) References Cited

U.S. PATENT DOCUMENTS

| | | | |
|---|---|---|---|
| 9,542,941 B1 | 1/2017 | Weksler | |
| 2015/0235447 A1* | 8/2015 | Abovitz | G01B 11/303 345/633 |
| 2018/0173309 A1* | 6/2018 | Uchiyama | G06F 3/011 |

(Continued)

FOREIGN PATENT DOCUMENTS

| | | | | |
|---|---|---|---|---|
| CN | 111243103 A | * | 6/2020 | A63F 13/52 |
| EP | 3546136 A1 | * | 10/2019 | B25J 19/06 |

(Continued)

OTHER PUBLICATIONS

Anonymous. "Secondary User Verification." Printed Jul. 8, 2021. 10 pages. Published by Google. https://developers.google.com/assistant/smarthome/develop/secondary-user-verification.

(Continued)

*Primary Examiner* — Todd Buttram
(74) *Attorney, Agent, or Firm* — Haley J. McClory

(57) ABSTRACT

A processor may receive user command generated by a user. A processor may analyze user information for one or more official activities. The one or more official activities are based, at least in part, on a security policy. A processor may identify the user information is associated with the one or more official activities. A processor may prevent, responsive to determining the user command is associated with the one or more official activities, the one or more personal devices from collecting the user command.

20 Claims, 5 Drawing Sheets

(56) References Cited

U.S. PATENT DOCUMENTS

| | | |
|---|---|---|
| 2019/0281387 A1 | 9/2019 | Woo |
| 2020/0068476 A1 | 2/2020 | Deluca |
| 2020/0395011 A1 | 12/2020 | Yani |
| 2021/0337460 A1* | 10/2021 | Breaux, III ........... H04W 4/027 |
| 2021/0358251 A1* | 11/2021 | Maclean .................. G07C 9/37 |
| 2023/0066524 A1* | 3/2023 | Karri ..................... G06T 19/006 |

FOREIGN PATENT DOCUMENTS

| | | | |
|---|---|---|---|
| WO | WO-2017006640 A1 * | 1/2017 | ............... A61B 5/48 |
| WO | WO-2018187674 A1 * | 10/2018 | .......... G01M 99/005 |

OTHER PUBLICATIONS

Anonymous. "Sleep and Wake Commands for Voice-Activated Devices." Published Jun. 20, 2018. 10 pages. Published by IP.com. https://priorart.ip.com/IPCOM/000254316.

Anonymous. "System and method to prevent virtual assistants to recognize and react to wake-words." Published Oct. 7, 2019. 4 pages. Published by IP.com. https://priorart.ip.com/IPCOM/000259994.

Mell, et al., "The NIST Definition of Cloud Computing," Recommendations of the National Institute of Standards and Technology, U.S. Department of Commerce, Special Publication 800-145, Sep. 2011, 7 pgs.

\* cited by examiner

US 11,804,018 B2

MANAGEMENT OF DEVICES IN A SMART ENVIRONMENT

BACKGROUND

The present disclosure relates generally to the field of artificial intelligence, and more particularly to the field of smart devices.

Computing devices or other smart devices have evolved over time to accomplish various tasks for humans, making our lives easier. Such devices can be found in people's homes and offices to assist people with some aspect of their day. As these devices have grown in popularity, so too have their usefulness and their ability to enhance users' daily experience.

SUMMARY

Embodiments of the present disclosure include a method, computer program product, and system for managing an one or more personal devices in a smart environment. A processor may receive user command generated by a user. A processor may analyze user information for one or more official activities. The one or more official activities are based, at least in part, on a security policy. A processor may identify the user information is associated with the one or more official activities. A processor may prevent, responsive to determining the user command is associated with the one or more official activities, the one or more personal devices from collecting the user command.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
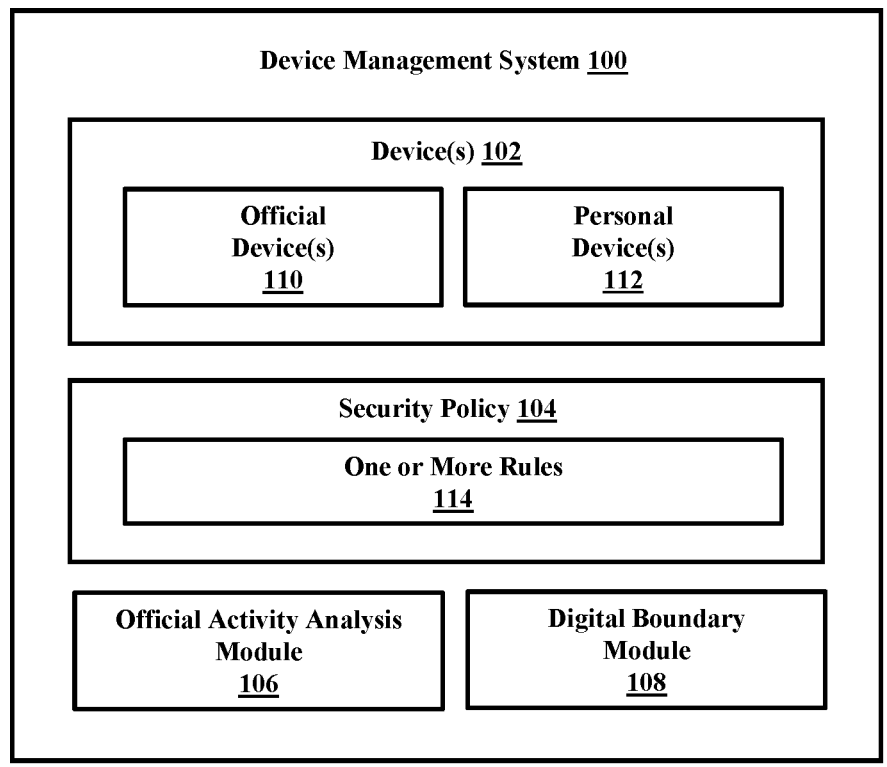
FIG. 1 depicts a block diagram of an embodiment of a device management system, in accordance with the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of artificial intelligence (AI), and more particularly to smart devices. While the present disclosure is not necessarily limited to such applications, various aspects of the disclosure may be appreciated through a discussion of several examples using this context.

The demand for personal smart devices has risen significantly over the years as the usefulness of such devices has expanded into both a person's home and work-life. Often such devices connect to one or more other devices or networks, allowing the devices to interact with each other and provide more utility for a user. For example, a user of a smart device may be able to order a product from a website using voice commands and have the product shipped directly to them. The usefulness of such smart devices is compounded when combined with AI techniques. Such AI enabled personal smart devices can be configured into a type of virtual assistant to generate an AI assistant capable of performing complex tasks (e.g., tasks traditionally performed by a personal assistant). Such personal smart devices are often configured to collect information from the surrounding environment (e.g., smart environment). Often, the more data (e.g., user information) received/collected over time by these devices, the more accurately the personal smart device can perform a particular task.

In light of the recent COVID-19 pandemic, more people than ever are transitioning from working in an office setting provided by their employer to working from offices situated within their homes. In some situations, employees are required to utilize information classified as private, sensitive, and/or confidential information to perform various work related duties. Previously, employers were able to configure workplaces to ensure various forms of private, sensitive, and/or confidential information were properly protected from accidental disclosure. As employees have transitioned to working from home offices or other environments outside the traditional workplace, employees and employers have had to evolve and adapt to policies that ensure various forms of information are protected.

Due the complex learning capabilities associated with personal smart devices, it is possible to make accidental disclosures of official information (e.g., private, sensitive, privileged, and/or confidential information). For example, a health care professional may work from a home office and use video conference calls to provide medical care or counseling to patients. In this example, if the health care professional were to have a personal smart device configured within their home office, the personal smart device may collect information associated with the patient. While the personal smart device may utilize this information to add the patient to the health care professional's personal contact list, the patient information collected is unlikely to be secure and may violate not only the employer's guidelines, but also legal regulations associated with the management of private health care or medical data. As such, there is a desire to ensure particular types of information (e.g., private, sensitive, privileged, and/or confidential information), such as those types produced while performing work related activities (e.g., official activities) are properly managed in a smart environment having one or more personal smart devices.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

It will be readily understood that the instant components, as generally described and illustrated in the figures herein, may be arranged and designed in a wide variety of different configurations. Accordingly, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the FIGS., any connection between elements can permit one-way and/or two-way communication even if the depicted connection is a one-way or two-way arrow.

Also, any device depicted in the drawings can be a different device. For example, if a mobile device is shown sending information, a wired device could also be used to send the information. The term "module" may refer to a hardware module, software module, or a module may be a combination of hardware and software resources. Embodiments of hardware-based modules may include self-contained components such as chipsets, specialized circuitry, one or more memory devices and/or persistent storage. A software-based module may be part of a program, program code or linked to program code containing specifically programmed instructions loaded into a memory device or persistent storage device of one or more data processing systems operating as part of the computing environment (e.g., intelligent ecosystem 100).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

In embodiments discussed herein, solutions are provided in the form of a method, system, and computer program product, for managing one or more personal devices in a smart environment. Embodiments contemplated herein may enable a user to prevent official activities and associated information from being collected and/or processed by one or more personal devices. Such embodiments may be used by employers and employees to ensure information associated with official activities (e.g., private, sensitive, privileged, and/or confidential information) are properly protected when employees perform work or official activities in a smart environment (e.g., an environment having one or more personal devices), such as a home office.

A smart environment may include any area, room, conference hall, home, building that may have one or more personal devices, etc. In some embodiments, a smart environment may range in complexity from a single personal device to more than one personal device, such as a smart house or smart building. In embodiments, one or more personal devices may be any type of device that may be configured to receive/collect information or data from a smart environment. A personal device (e.g., personal smart device) may include, but is not limited to, a smartwatch, voice assistant device (e.g., Google home®, Amazon Alexa®, Siri®, Bixby®, etc.), Internet of Things (IoT) device(s), any available smart device, or any combination thereof. In some embodiments, a personal device may be configured using AI capabilities to collect/receive information associated with the smart environment, to learn and provide the user with additional services or ability to provide more tasks. For example, a user in a smart environment may be making vacation plans with a travel agent during a phone conversation. In this example, a personal device may be configured to receive/collect user information from a user's phone conversation and analyze the user information to identify that the dates the user will be away from the home vacationing. Using this analysis, the personal device may update the user's calendar regarding the user's availability and may generate a to-do list with tasks the user may need to complete prior to leaving for vacation.

In embodiments, a processor may prevent the accidental disclosure of information associated with official activities. An official activity may include, but is not limited to work related activities a user may perform in a remote office or home office (e.g., an office not configured in the traditional workplace setting). More particularly, embodiments discussed herein may prevent the accidental disclosure of information associated with official activities (e.g., private, sensitive, privileged, and/or confidential information) to a third party personal device when a user performs official activities within a smart environment having at least one personal device.

For example, embodiments discussed herein may ensure that employees working from home offices are able to perform their duties in a home office configured in smart environment (e.g., smart house) without unintentionally disclosing information associated with official activities to a personal device or, alternatively, disclosing personal information to an official device (e.g., such as those with AI capabilities that may utilize user information). While many examples are provided herein that refer to a user as an employee working in a home office, embodiments contemplated herein should not be considered to be limited to such configurations and any configuration that may include managing one or more personal devices in a smart environment may alternatively be used.

In embodiments, a processor may ensure user information associated with official activities is not collected and/or processed by one or more personal devices in a smart environment by managing the one or more personal devices. In embodiments, a processor may receive or collect user information generated by a user. In these embodiments, a processor may receive/collect user information from one or more data collection devices (e.g., Internet of Things (IoT)

devices, etc.). Such data collection devices may provide the processor with real-time data or user information. While in some embodiments, one or more data collection devices may be configured within the smart environment, in other embodiments, the one or more data collection devices may be configured within one or more official devices. In these embodiments, an official device may include any device that is provide permission (e.g., via a security policy) to utilize information associated with official activities. Official devices may include any device (e.g., work laptop, work mobile phone, work AI assistant device, any device with work related applications/software, etc.) that a user may utilize to perform an official activity. In one example embodiment, an official device may include a device that enables a user to work from home while also allowing the user to connect to a cloud host server, such as a cloud host server associated with the user's particular workplace.

A smart environment may include any number of official devices. In some embodiments, a user may use a personal laptop or mobile phone (e.g., devices not provided by an employer or workplace) as an official device. While in some embodiments, an official device may be permanently considered an official device, in other embodiments, a processor may convert, as needed, a personal laptop or mobile device as an official device. In these embodiments, a processor may convert the personal laptop or mobile phone as an official device when a user uses an official application (e.g., WebEx® or other work related applications). In some embodiments, a processor may determine the personal laptop or mobile phone is an official device when the user connects to the cloud hosted server provided by the workplace.

In embodiments, user information may include, but is not limited to, any information associated with the smart environment and/or the user, such as a user's actions/activities (e.g., user speaking, user gestures, whether the user is sitting/standing, etc.), activities associated with the smart environment (e.g., lights on/off, time, background noise, etc.), and/or work-related information. For example, user information associated with work-related information may include the user's work calendar and agenda.

In embodiments, a processor may analyze user information for one or more official activities. In these embodiments, a processor may utilize AI and machine learning techniques to analyze the user information. A processor may base this analysis, at least in part on a security policy. In embodiments, a security policy may include one or more rules or regulations that provide guidance regarding what is considered an official activity and how the information associated with the official activity should be protected or secured from accidental disclosure (e.g., disclosed to one or more personal devices).

In embodiments, the one or more rules associated with a security policy may include guidance associated identifying an official activity, such as whether the user attending a meeting (e.g., video or phone meeting) is an official activity, if the user attending a meeting with a particular person is an official activity, whether if by working on a particular project (e.g., writing or editing code) the user may be performing an official activity, what devices may be considered an official device, whether a personal laptop or phone may be used as an official device, whether the user is connected to a particular VPN (e.g., work-related VPN) may be considered an official device, how an official activity may be identified in a smart environment, what protection parameters (e.g., digital boundary) should be followed depending on the official activity, how the one or more personal devices within a smart environment may be identified, and/or how the one or more personal devices within a smart environment may be affected by the protection parameters.

In some embodiments, a processor may base the analysis, at least in part, on the generation of a digital twin of the smart environment that may mimic different aspects of the home office and official activities.

In embodiments, a processor may analyze the user information for one or more official activities and determine that the user information does not include one or more official activities (e.g., based on AI capabilities and security policy). In these embodiments, a processor may instruct the one or more personal devices configured within the smart environment to perform as traditionally expected (e.g., collect/process user information).

In embodiments, a processor may identify the user information is associated with one or more official activities. In these embodiments, a processor may be configured to prevent the one or more personal devices from processing or collecting the user information. In some situations, a personal device may passively listen to or observe the user to determine if the user has submitted a particular wakeup command (e.g., voice command, gesture, biometric parameter, etc.) specific to the personal device. In these embodiments, a personal device may be configured to begin listening or for the user to issue a command or tasks (e.g., included in user information) for the personal device to process or perform. While many personal devices wait for their wakeup command before collecting information/data, in some situations a personal device may unintentionally awaken and accidently collect information/data from the smart environment without the user summitting a wakeup command, or a user may forget they are performing official activities and provide the personal device with the wakeup command and task. Such actions may enable the personal device the ability to collect information associated with the official activities.

In these embodiments, a processor may prevent the one or more personal devices from processing (e.g., collecting) the user information by instructing the one or more personal devices to remain inactive and/or not to process or collect user information for the duration of the official activity. In one example embodiment, a processor may identify that a user is using a the Webex® application (e.g., official application) to conduct a work meeting. In this embodiment, a processor will prevent the one or more devices in the smart environment from collecting user information associated with the Webex® meeting (e.g., official action) by instructing the one or more personal devices to remain inactive. In this example embodiment, even if the user were to accidently issue a wakeup command or the personal device were to wake up without the wakeup command, the processor would ensure that no user information was collected or processed by the personal device (e.g., the processor may instruct the personal device to return to sleep mode). In an alternative embodiment, a processor may configure a personal device that is activated (e.g., accidently/unintentionally) to request validation from the user. For example, a personal device that is activated during an official activity may ask the user, "are you asking me to wake?" In these embodiments, the processor may analyze the user information to determine if the user intentionally requested the personal device. In these embodiments, the validation request may act as an override that allows the user to access the personal device in particular circumstances, such as an emergency.

In embodiments where a processor has analyzed and determined the user information includes one or more official activities, a processor may be configured to instruct one or more official devices to collect and/or process the user information and perform any task a user may generate during the official activity. In these embodiments, a processor may configure the official devices to respond to the user's commands in a similar manner to the personal devices. For example, the official device may respond to the same wakeup command the personal device is configured to respond to.

In embodiments, a processor may generate a digital boundary within the smart environment. A digital boundary may be generated in response to a processor identifying the user information is associated with one or more official activities. In embodiments, a digital boundary may include at least a portion of the smart environment. A portion may range in size from a small area (e.g., desk area of the home office) of the smart environment to the entire smart environment (e.g., entire smart home). The portion size of the digital boundary may reflect the level of confidentiality an official activity may require. For example, the digital boundary associated with a low level of confidentiality may comprise a small portion of the smart environment, while a digital boundary associated with a high level of confidentiality may include the majority or entire smart environment. In embodiments, a processor may analyze the smart environment and identify each of the one or more personal devices and where each of the one or more personal devices are located in the smart environment. A processor may configure the one or more personal devices configured within the digital boundary from collecting and/or processing the user information associated with an official activity.

In embodiments, a processor may configure the digital boundary based on the one or more official activities and the security policy. As referenced herein, the security policy may include one or more rules associated with what protection parameters or digital boundaries may be required depending on a particular official activity. In one example embodiment, a user may be performing an official activity, such as writing code, in a home office within a smart home. In this example, a processor may analyze the user information and identify writing code as an official activity (e.g., based on the security policy). The processor may then access the security policy and determine the level of protection the official activity of writing code requires. In this example, the security policy may require all personal devices within the immediate space where the official activity is occurring must remain inactive. Continuing this example, a processor may then generate a digital boundary (e.g., using a digital twin of the home office and smart environment) that includes the home office. The processor may then prevent the one or more personal devices within the digital boundary from collecting and/or processing any of the user information for the duration of the official activity.

In some embodiments, a processor may continuously receive user information. In embodiments, a processor may identify a first official activity and continue to receive user information. In these embodiments, a processor may receive user information indicating the user has completed the first official activity and begun a different second official activity. In response to a change from one particular official activity to another, a processor may alter the digital boundary (e.g., generate a new digital boundary) that corresponds to the requirements (e.g., security policy) associated with the new official activity. In some embodiments, a processor may be configured to consider how user information may be sensed throughout the smart environment (e.g., using digital twin technology). In these embodiments, a processor may analyze and simulate how different components (e.g., wall thickness, building age, furniture in the home office, etc.) may affect the visual or audio transference of user information throughout the smart environment.

For example, when continuing the above example embodiment, a processor may determine that a user has finished writing code (e.g., first official activity). In this example embodiment, the processor may then identify from the user information that the user is beginning a conference meeting with a group of colleagues (e.g., second official activity). Because sound may carry through walls, the security policy may include rules that require a larger digital boundary. In this example embodiment, a processor may increase the size of or generate a new digital boundary that includes rooms proximate to the home office (e.g., rooms that share at least one wall with the home office). In such an embodiment, a processor would prevent those personal devices, configured within the newly formed digital boundary, from collecting or processing user information.

In some embodiments, a processor may generate an augmented reality (AR) associated with the digital boundary. In these embodiments, a processor may configure an AR device, such as an AR headset, to display the digital boundary to the user. Such embodiments enable the user to view and understand where the digital boundary is configured within the smart environment. By viewing the digital boundary with an AR headset, a user may better understand what personal device will receive user commands and which personal devices will be inactive depending on the particular official activity.

In embodiments, a processor may be configured to collect and store user information in an historical repository. In these embodiments, a processor may use AI and machine learning techniques to analyze the historical user information and identify keywords from conversations or communications between the user and other people. These conversations and communications between the user and other people may include people in the smart environment and those people the user may be communicating with remotely via phone or video conference. In some embodiments, a processor may identify keywords from persons (other than the user) who wish to interact with the user. In these embodiments, a processor may automatically generate a to-do list, based off of the keywords identified from other persons. In these embodiments, a processor may notify and provide the user with the to-do list when the user has completed the one or more official activities.

In some embodiments, a processor may use AI and machine learning techniques to analyze the historical user information to generate one or more rules of the security policy. For example, a processor may analyze user information to determine one or more rules including, but not limited to, how long official activities traditionally take, the size of the digital boundary in relation to a particular official activity, and determining if the user is performing a new official activity that was previously undefined. For example, if a user is asked by a supervisor to perform a new task outside their traditional work area, a processor may identify this new task as an official activity (e.g., based on the relation of the supervisor to the user).

In embodiments, a processor may use voice recognition techniques to differentiate between the user and other people occupying the smart environment. In some embodiments, a personal device located within the digital boundary may receive a command from another person in the smart environment who is not the user. In these embodiments, a processor may instruct the personal device to process and respond to the other person while preventing the personal device from collecting or processing user information that may be associated with the one or more official activities.

In some embodiments, a processor may be configured to determine where a user is located in proximity to the personal device. The processor may be configured to use beamforming technology to identify the direction and distance of the user's voice command. In these embodiments, a processor may validate whether the user is still located within the digital boundary. In some embodiments, where a user, who is no longer located within the digital boundary, issues a command, a processor may instruct a personal device within the digital boundary to process the command.

In some embodiments, a processor may use work-related information, such as meeting information associated with a work calendar, to automatically prevent the user information from being collected by a personal device at the time the meeting is scheduled.

In some embodiments, a processor may be configured to perform a passive action at a particular time. In these embodiments, a passive action may include receiving and analyzing communications and determining if the communications are not related to official activities. These communications may include phone calls, video calls, and/or visitors to the smart environment (e.g., delivery person at front door to smart house). In these embodiments, a processor may indicate to the caller or visitor the availability of the user. For example, the processor may analyze calendar information to determine the user will finish a work meeting (e.g., official activity) in five minutes. In this example, the processor may generate an automated audio message that indicates to the caller, visitor, or delivery person that the user will be available in five minutes. In some embodiments, a processor may be configured to interact with one or more external applications. External applications may be installed for users occupying smart environments in gated communities to communicate with other persons in the gated community (e.g., service providers). In these embodiments, a processor may be configured to allow persons associated with the gated community to communicate (e.g., via the one or more personal devices) with the user when the user is not participating in an official activity. In these embodiments, when a person is not participating in an official activity, the one or more personal devices may execute user information as traditionally expected.

Referring now to FIG. 1, a block diagram of device management system 100 for managing one or more personal devices in a smart environment, is depicted in accordance with embodiments of the present disclosure. FIG. 1 provides an illustration of only one implementation and does not imply any limitations with regard to the environments in which different embodiments may be implemented. Many modifications to the depicted environment may be made by those skilled in the art without departing from the scope of the invention as recited by the claims. In some embodiments, the solar panels may be directed by the computing device to move to a more advantageous angle.

In embodiments, device management system 100 may include device(s) 102, security policy 104, official activity analysis module 106, digital boundary module 108. In embodiments, device(s) 102 may be configured in a smart environment. In these embodiments devices 102 may include one or more personal devices 112. One or more personal devices 112 may be configured to receive commands or instructions from a user. In some embodiments, device management system 100 may include one or more official devices 112. Official devices 112 may include one or more devices that may be provided permission to collect or process user information while a user is performing one or more official activities. In some embodiments, an official device 112 may include a device the user utilizes to perform an official activity.

In embodiments, security policy 104 may include one or more rules 114. Device management system 100 may be configured to use one or more rules 114 to define what may be considered an official device 110 and/a personal device 112 and how each device in the smart environment may be instructed to perform under different circumstances (e.g., if the user information includes an official activity).

In embodiments, official activity analysis module 106 may be configured by device management system 100 to collect and analyze user information. In some embodiments, official activity analysis module 106 may store user information in a historical repository. The official activity analysis module 106 may analyze historical user information using AI and machine learning techniques to identify when the user is performing one or more official activities as well as, when a user may be performing a new, previously unknown, official activity that may be added to the one or more rules 114 of security policy 104.

In embodiments, digital boundary module 108 may receive data from official activity analysis module 106 regarding if user information includes an official activity. In these embodiments, if official activity analysis module 106 detects or observes an official activity in the user information, device management system 100 may prevent one or more personal devices 112 from collecting and/or processing user information. In these embodiments, device management system 100 may instruct digital boundary module 108 to generate a digital boundary based on security policy 104. In these embodiments, digital boundary module 108 may instruct one or more personal devices 112 within the digital boundary to not collect and/or process user information while instructing the one or more personal devices 112 outside the digital boundary to perform as traditionally intended.

Figure 2:
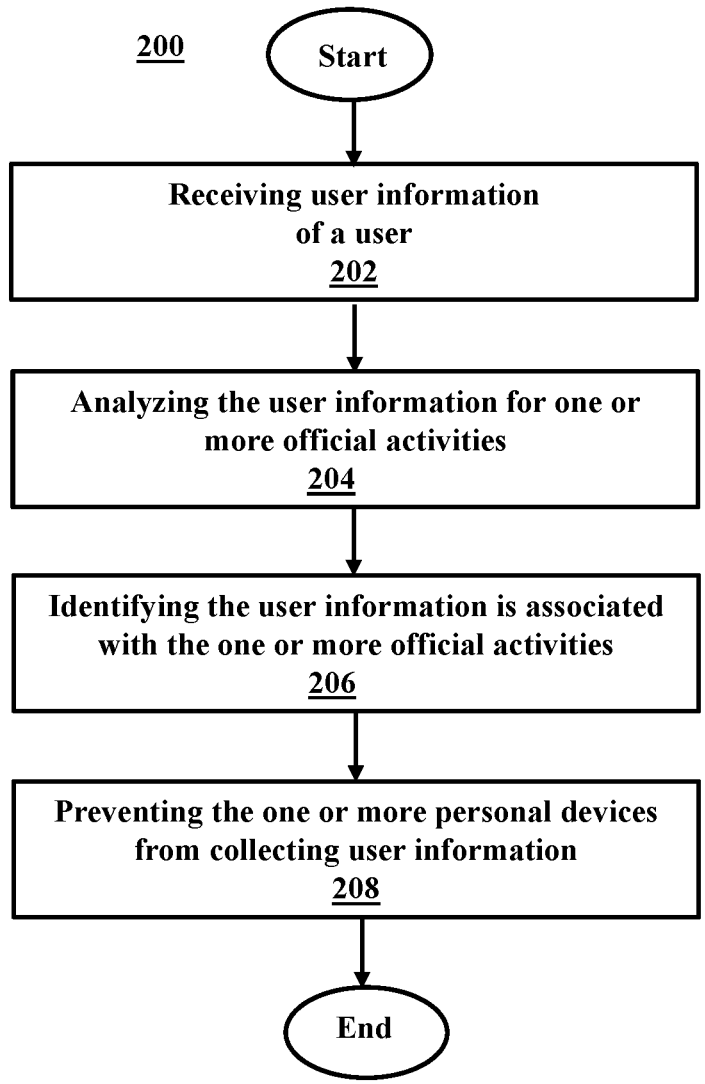
FIG. 2 illustrates a flowchart of a method for managing one or more personal devices in a smart environment, in accordance with embodiments of the present disclosure.

Referring now to FIG. 2, a flowchart illustrating an example method 200 for managing one or more personal devices in a smart environment, in accordance with embodiments of the present disclosure. FIG. 2 provides an illustration of only one implementation and does not imply any limitations with regard to the environments in which different embodiments may be implemented. Many modifications to the depicted environment may be made by those skilled in the art without departing from the scope of the invention as recited by the claims.

In some embodiments, the method 200 begins at operation 202 where a processor configures a computing device to receive user information generated by a user. In some embodiments, the method 200 proceeds to operation 204.

At operation 204, a processor may analyze the user information for one or more official activities. In embodiments the one or more official activities may be based, at least in part on a security policy. In some embodiments, the method 200 proceeds to operation 206.

At operation 206, a processor may identify the user information is associated with one or more official activities. In some embodiments, the method 200 proceeds to operation 208.

At operation 208, a processor may prevent the one or more personal devices from collecting user information. In some embodiments, a processor may prevent the one or more personal devices from collecting user information responsive to identifying the user information is associated with the one or more official activities. In some embodiments, as depicted in FIG. 2, after operation 208, the method 200 may end.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
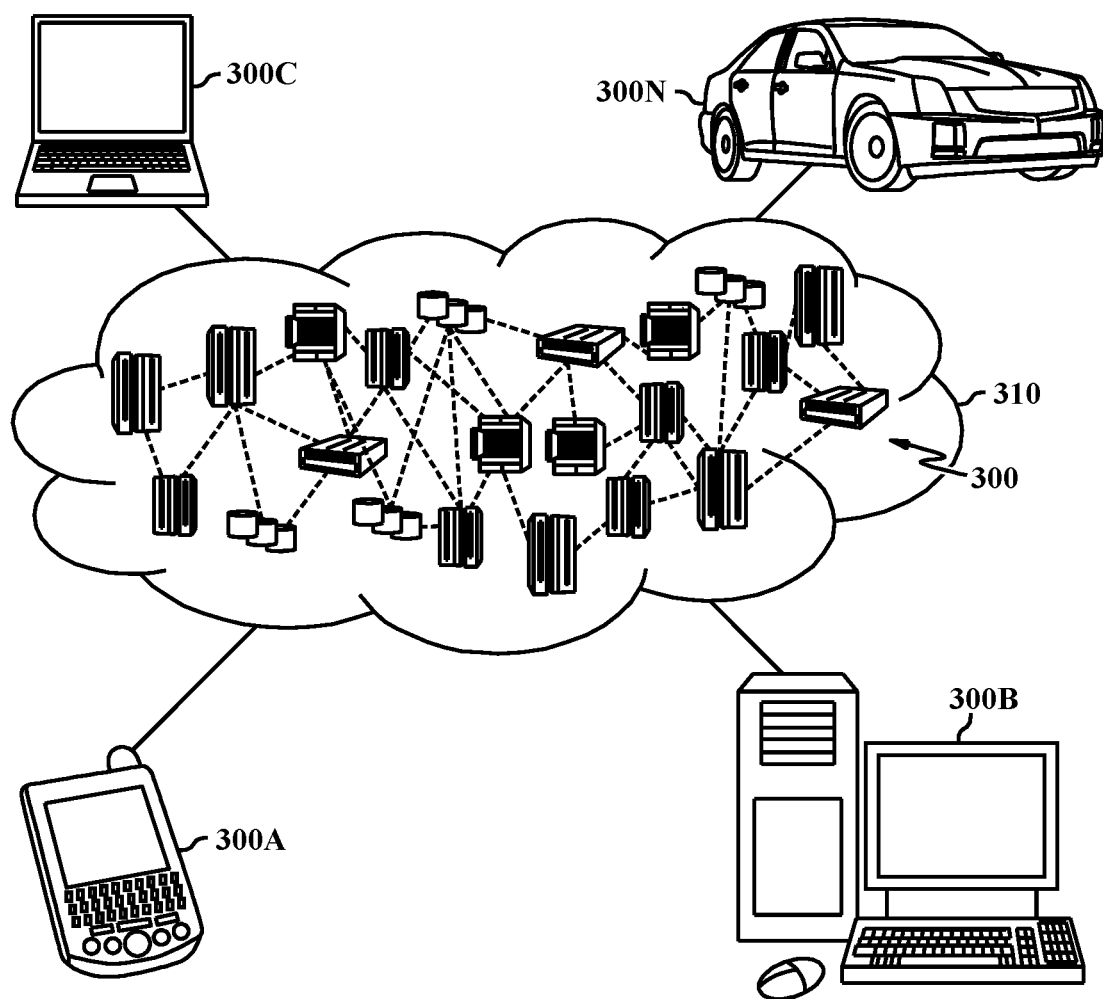
FIG. 3A illustrates a cloud computing environment, in accordance with embodiments of the present disclosure.

Referring now to FIG. 3A, illustrative cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof. This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing 300 and cloud computing environment 310 can communicate with any type of computerized device over any type of network and/or network addressable connection (e.g., using a web browser).

Figure 3B:
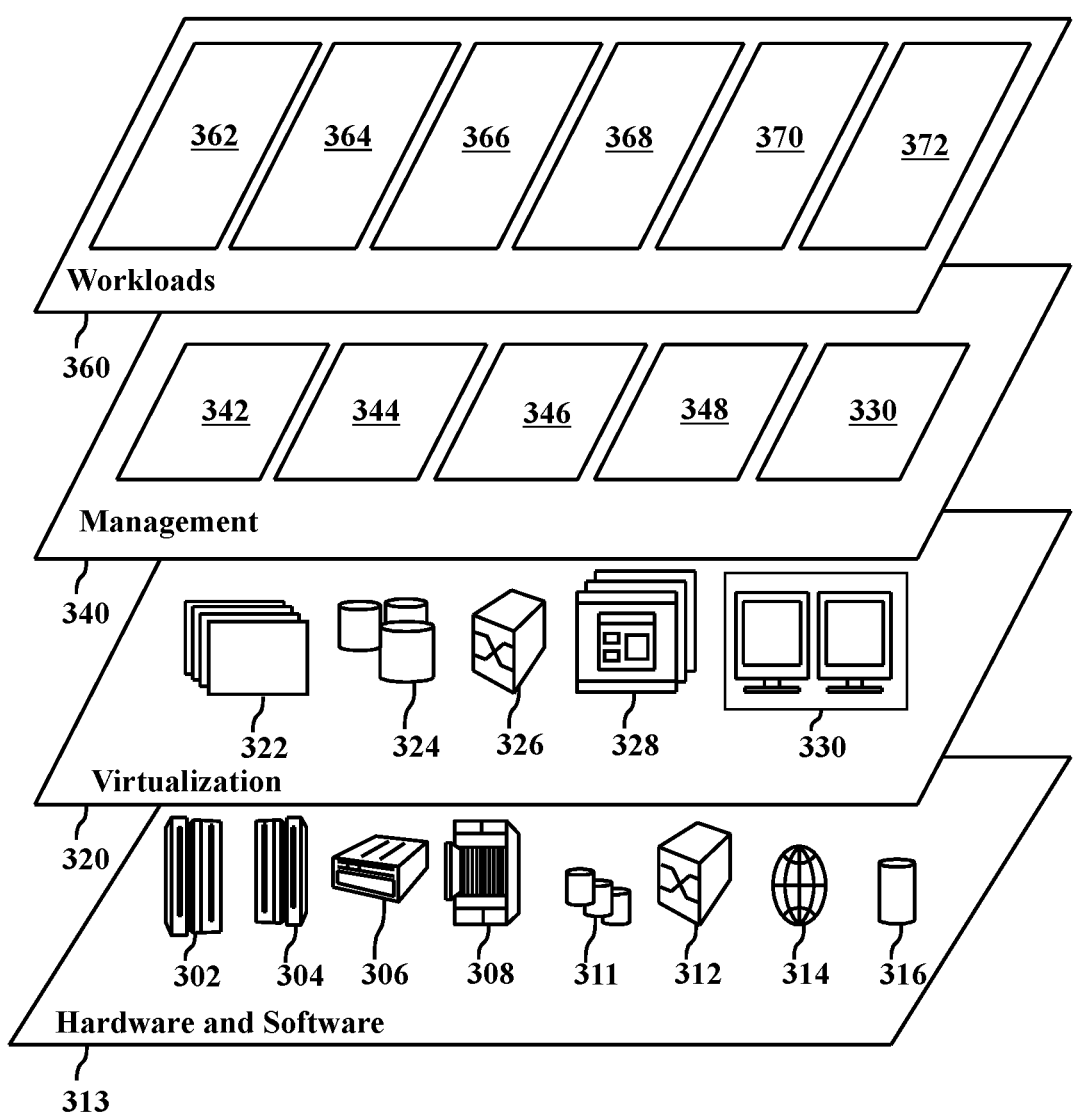
FIG. 3B illustrates abstraction model layers, in accordance with embodiments of the present disclosure.

Referring now to FIG. 3B, a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and personal device managing 372.

Figure 4:
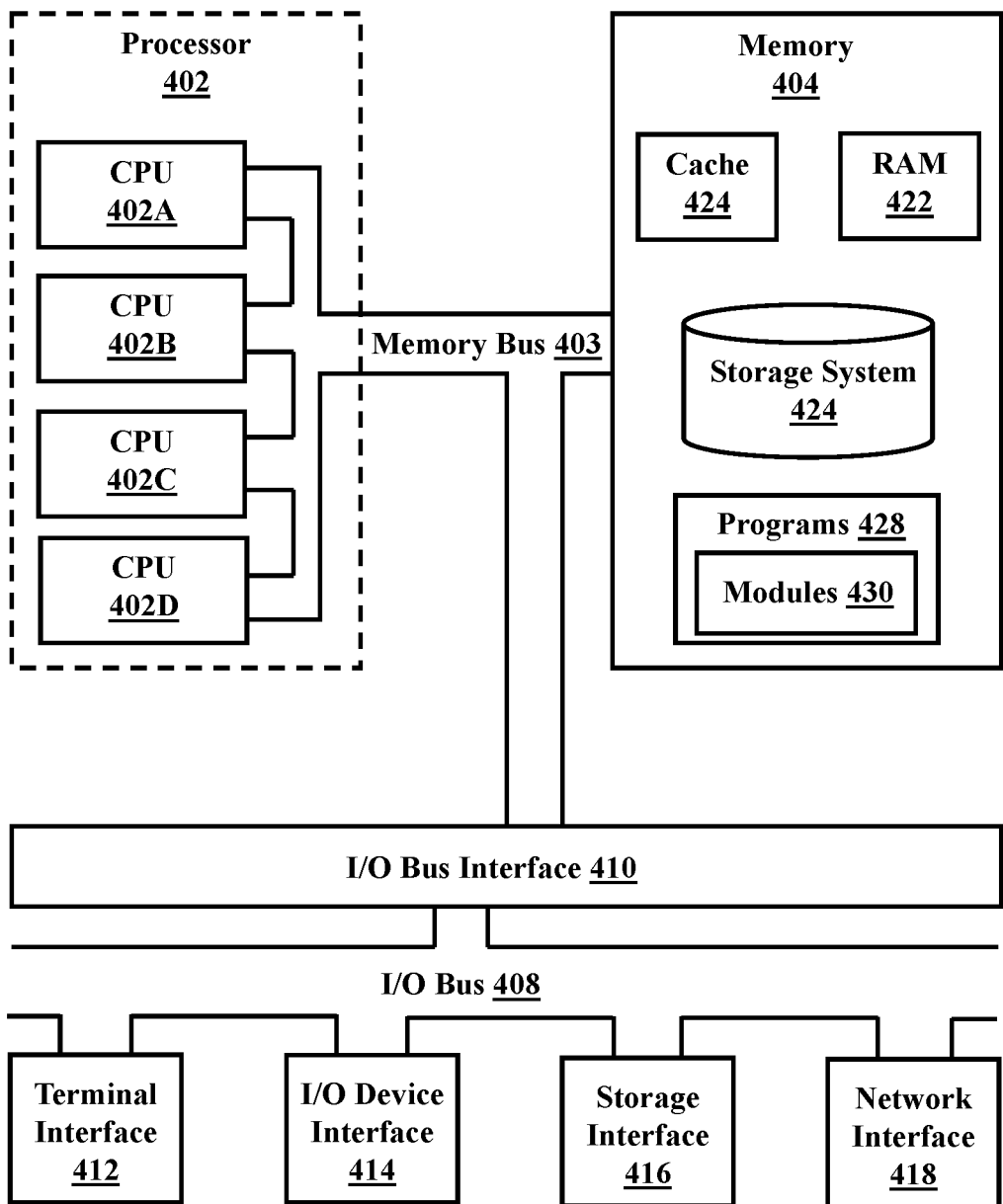
FIG. 4 illustrates a high-level block diagram of an example computer system that may be used in implementing one or more of the methods, tools, and modules, and any related functions, described herein, in accordance with embodiments of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present invention. In some embodiments, the major components of the computer system 401 may comprise one or more Processor 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method for managing one or more personal devices in a smart environment, the method comprising:
   receiving, by a processor, user information from a user;
   analyzing the user information for one or more official activities, wherein the one or more official activities are based, at least in part on a security policy;
   identifying the user information is associated with the one or more official activities;
   simulating a transference of the user information in the smart environment and the one or more personal devices; and
   preventing, responsive to identifying the user information is associated with the one or more official activities, at least one of the one or more personal devices from collecting the user information based on the transference of the user information.

2. The method of claim 1, wherein analyzing the user information for one or more official activities includes:
   instructing one or more official devices to process the user information.

3. The method of claim 1, further comprising:
   generating a digital boundary within the smart environment, wherein the digital boundary is at least a portion of the smart environment.

4. The method of claim 3, wherein a group of the one or more personal devices inside the digital boundary are configured to be prevented from collecting the user information and a second group of the one or more personal devices outside the digital boundary are configured to not be prevented from collecting the user information.

5. The method of claim 3, further comprising:
   generating an augmented reality (AR) environment, wherein the AR environment is configured to display the digital boundary to the user.

6. The method of claim 5, wherein the AR environment is generated based, at least in part, on a digital twin of the smart environment.

7. The method of claim 1, further comprising:
   instructing the one or more personal devices, responsive to preventing the one or more personal devices from executing the user information, to perform a passive action.

8. A system for managing one or more personal devices in a smart environment, the system comprising:
   a memory; and
   a processor in communication with the memory, the processor being configured to perform operations comprising:
      receiving, by a processor, user information from a user;
      analyzing the user information for one or more official activities, wherein the one or more official activities are based, at least in part on a security policy;
      simulating a transference of the user information in the smart environment and the one or more personal devices; and
      preventing, responsive to identifying the user information is associated with the one or more official activities, at least one of the one or more personal devices from collecting the user information based on the transference of the user information.

9. The system of claim 8, wherein analyzing the user information for one or more official activities includes:
   instructing one or more official devices to process the user information.

10. The system of claim 8, further comprising:
    generating a digital boundary within the smart environment, wherein the digital boundary is at least a portion of the smart environment.

11. The system of claim 10, wherein a group of the one or more personal devices inside the digital boundary are configured to be prevented from collecting the user information and a second group of the one or more personal devices outside the digital boundary are configured to not be prevented from collecting the user information.

12. The system of claim 10, further comprising:
    generating an augmented reality (AR) environment, wherein the AR environment is configured to display the digital boundary to the user.

13. The system of claim 12, wherein the AR environment is generated based, at least in part, on a digital twin of the smart environment.

14. The system of claim 8, further comprising:
    instructing the one or more personal devices, responsive to preventing the one or more personal devices from executing the user information, to perform a passive action.

15. A computer program product for managing official activities of one or more personal devices in a smart environment, the computer program product comprising a computer readable storage medium having program instructions embodied therewith, the program instructions executable by a processor to cause the processors to perform a function, the function comprising:
    receiving, by a processor, user information from a user;
    analyzing the user information for one or more official activities, wherein the one or more official activities are based, at least in part on a security policy;
    simulating a transference of the user information in the smart environment and the one or more personal devices; and
    preventing, responsive to identifying the user information is associated with the one or more official activities, at least one of the one or more personal devices from collecting the user information based on the transference of the user information.

16. The computer program product of claim 15, wherein analyzing the user information for one or more official activities includes:
    instructing one or more official devices to process the user information.

17. The computer program product of claim 15, further comprising:

generating a digital boundary within the smart environment, wherein the digital boundary is at least a portion of the smart environment.

18. The computer program product of claim 17, wherein a group of the one or more personal devices inside the digital boundary are configured to be prevented from collecting the user information and a second group of the one or more personal devices outside the digital boundary are configured to not be prevented from collecting the user information.

19. The computer program product of claim 17, further comprising:

generating an augmented reality (AR) environment, wherein the AR environment is configured to display the digital boundary to the user.

20. The computer program product of claim 19, wherein the AR environment is generated based, at least in part, on a digital twin of the smart environment.

* * * * *